(12) United States Patent
Guo (10) Patent No.: US 11,169,432 B2
(45) Date of Patent: Nov. 9, 2021

(54) LCD PROJECTOR OPTICAL SYSTEM AND PROJECTION METHOD

(71) Applicant: NANHUA INTELLIGENT PRECISION MACHINE (SHENZHEN) CO., LTD., Guangdong (CN)

(72) Inventor: Hanwen Guo, Jiangsu (CN)

(73) Assignee: NANHUA INTELLIGENT PRECISION MACHINE (SHENZHEN) CO., LTD., Guangdong (CN)

( * ) Notice: Subject to any disclaimer, the term of this patent is extended or adjusted under 35 U.S.C. 154(b) by 0 days.

(21) Appl. No.: 16/926,776

(22) Filed: Jul. 13, 2020

(65) Prior Publication Data

US 2020/0341353 A1 Oct. 29, 2020

(30) Foreign Application Priority Data

Apr. 27, 2020 (CN) .......................... 202010342498.5

(51) Int. Cl.
  *G03B 21/00* (2006.01)
  *G02B 27/28* (2006.01)
  *G03B 21/20* (2006.01)
  *G03B 21/53* (2006.01)
  *H04N 9/31* (2006.01)

(52) U.S. Cl.
  CPC .......... *G03B 21/006* (2013.01); *G02B 27/283* (2013.01); *G03B 21/2033* (2013.01); *G03B 21/2066* (2013.01); *G03B 21/53* (2013.01); *H04N 9/3197* (2013.01)

(58) Field of Classification Search
  CPC .............. G03B 21/006; G03B 21/2033; G03B 21/2066; G03B 21/53; G02B 27/283; H04N 9/3197
  USPC ............................................................ 353/31
  See application file for complete search history.

(56) References Cited

U.S. PATENT DOCUMENTS

2009/0310042 A1* 12/2009 Vidal ................. G02F 1/133603
                                                             349/8
2013/0077283 A1*  3/2013 Li ............................ H04N 9/31
                                                            362/19

* cited by examiner

*Primary Examiner* — Jerry L Brooks (57) ABSTRACT

An LCD projector optical system includes: an LED light source, a transflective plate, a condensing device, a first focusing lens, a polarization modulation plate, a brightness-increasing polarizing plate, an LCD light valve, a field lens, a reflector, and a projection lens, which are all arranged sequentially along a light travel direction; wherein the transflective plate has a light-transmitting portion and a reflecting portion. Light from the LED light source enters the condensing device from the light-transmitting portion, and then transmitted light and reflected light in illumination light are separated by the brightness-increasing polarizing plate. A beam of polarized light useless for the LCD light valve is reflected back and condensed by the first focusing lens and the condensing device on the reflection portion and the light-transmitting portion of the transflective plate, and then reflected back to the brightness-increasing polarizing plate through the reflection portion and the light-transmitting portion.

18 Claims, 6 Drawing Sheets

LCD PROJECTOR OPTICAL SYSTEM AND PROJECTION METHOD

CROSS REFERENCE OF RELATED APPLICATION

The present invention claims priority under 35 U.S.C. 119(a-d) to CN 202010342498.5, filed Apr. 27, 2020.

BACKGROUND OF THE PRESENT INVENTION

Field of Invention

The present invention relates to LCD projector technologies, and more particularly to an LCD projector optical system and a projection method.

Description of Related Arts

Single LCD projector has always been of high consumption and low efficiency, whose optical efficiency is difficult to exceed 3.5%, thus fundamentally limiting performance and application of the single LCD projector. In recent years, the industry has been working on some relatively low-cost PCS (Polarization Conversion System) patented technologies to look forward to improving the efficiency of optical systems. Conventionally, the effects are very limited.

The conventional low-cost PCS technology has general problems with both its objectivity and correctness. There are two main representative technologies, which are now analyzed and illustrated referring to FIGS. 6 and 7.

Figure 6:
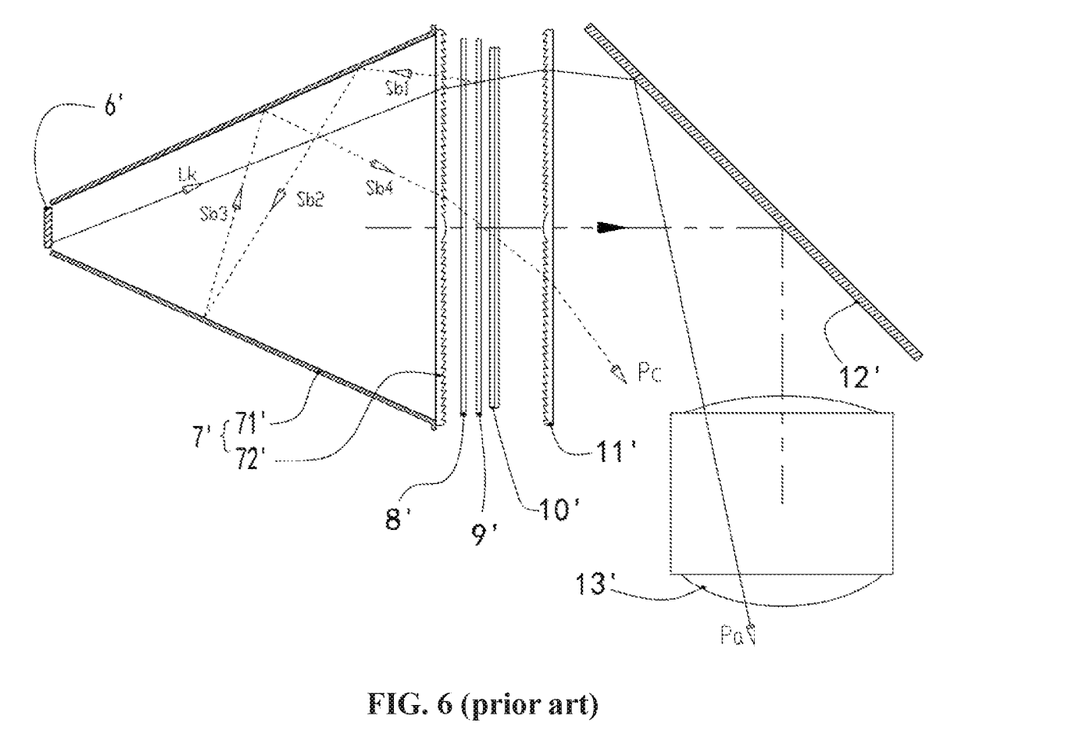
FIG. 6 is a s structural view of the prior art.

As shown in FIG. 6, an LED light source 6', a condensing device 7', a ¼ wave plate 8', a reflective polarizer 9', an LCD light valve 10', a rear Fresnel lens 11' (field lens), a reflecting mirror 12' and a projection lens 13' are arranged sequentially along a light travel direction, wherein the condensing device 7' comprises a pyramid condenser 71' and a front Fresnel lens 72'. The ideal situation is that etendue at an incident end of the pyramid condenser 71' is equal to etendue at the LCD light valve 10', and there is no etendue overflow (or slight overflow) at an emergent end. Any light reflected by the reflective polarizer 9' but cannot reach the incident end of the pyramid condenser 71', which is reflected from other parts of the condensing device 7' to the reflective polarizer 9' and is subjected to polarization conversion, can hardly be used by the projection lens 13 but only greatly increases heat of the LCD light valve 10'. Depending to the extent of the etendue overflow, light reflected by the reflective polarizer 9', which reaches the incident end of the pyramid condenser 71' after being refracted by the front Fresnel lens 72', is inversely proportional to the etendue overflow. In addition, even if the light reaches the incident end of the pyramid condenser 71', because both a reflectance of a light emitting surface of the LED light source 6' and available reflection efficiency of a substrate of the LED light source 6' are very low, light utilization rate improvement of such technology can hardly be more than 6%.

FIG. 6 shows a situation with a normal range of the etendue overflow. A main ray Lk emitted by the LED light source 6' passes through the pyramid condenser 71', the front Fresnel lens 72', and the ¼ wave plate 8' to reach the reflective polarizer 9'. Light Pa available for the LCD light valve 10' is separated through the reflective polarizer 9', while light Sb1 reflected by the reflective polarizer 9' is refracted by the ¼ wave plate 8' and the front Fresnel lens 72'. The Sb1 is then reflected multiple times by the pyramid condenser 71' into Sb2, Sb3, and Sb4, which reaches the reflective polarizer 9' after passing through the ¼ wave plate 8'. If can be transmitted by the reflective polarizer 9' at this time, the Sb4 will reach the LCD light valve 10', wherein a small part of the light is transmitted by the LCD light valve 10' to become stray light Pc, while most of the light is converted into Joule heat and consumed by the LCD light valve 10' Lost. Such technology lacks correctness and has no practical value.

Figure 7:
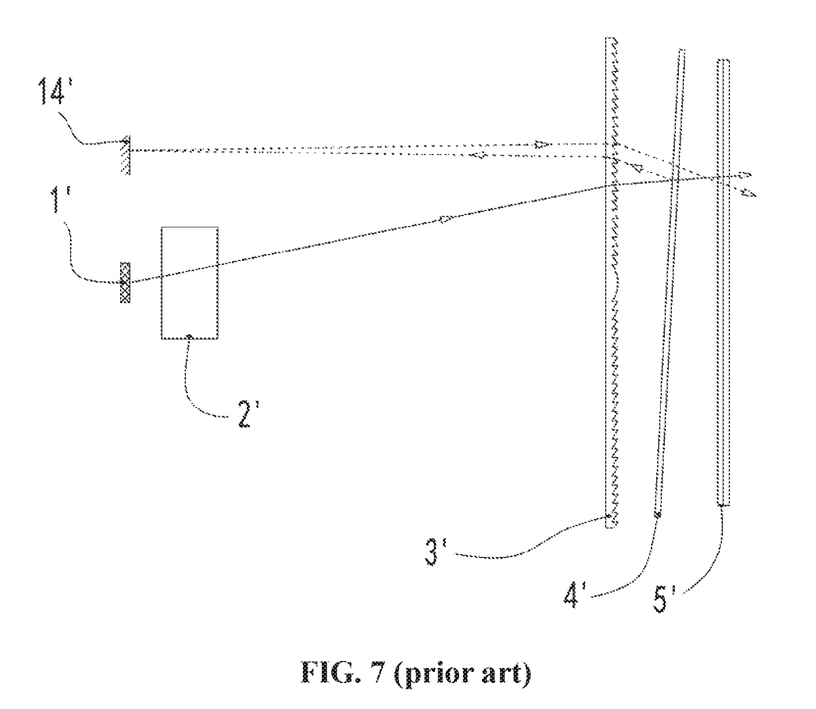
FIG. 7 is a structural view of the prior art.

Referring to FIG. 7, another representative PCS technology is shown, wherein a light source device 1', a condensing device 2', a front Fresnel lens 3', a reflective polarizer 4', an LCD 5', and a reflector 14' with a ¼ wave plate are arranged sequentially along a light travel direction. A common feature of such PCS technologies is: the reflective polarizer 4' is not parallel to the LCD 5', while the light source device 1' and the reflector 14' with the ¼ wave plate are arranged side by side. Such technology is similar to "perpetual motion" technology, whose etendue overflow is much more serious than the technology shown in FIG. 6, so the effect is naturally smaller. The technology does not conform to basic objective common sense.

In an era with increasing emphasis on energy consumption, comprehensive and scientific innovations are required for the conventional lighting technologies and deflection technologies of the single LCD projectors in order to truly improve the efficiency of an optical system, and that is the problem to be solved by the present invention.

SUMMARY OF THE PRESENT INVENTION

In order to solve the above technical problems, an object of the present invention is to provide an LCD projector optical system to improve light utilization rate, which has a simple structure, and is relatively low-cost.

Accordingly, the present invention provides an LCD (liquid-crystal display) projector optical system, comprising: an LED (light-emitting diode) light source, a transflective plate, a condensing device, a first focusing lens, a polarization modulation plate, a brightness-increasing polarizing plate, an LCD light valve, a field lens, a reflector, and a projection lens, which are all arranged sequentially along a light travel direction; wherein the transflective plate has a light-transmitting portion which allows light to pass through; a size and an area of the light-transmitting portion are no less than a size and an area of a light-emitting surface of the LED light source; an emergent surface of the transflective plate has a reflecting portion for reflecting light:

the light-emitting surface of the LED light source is opposite to the light-transmitting portion;

external dimensions of the reflecting portion are no less than dimensions of a light-through hole at an incident end of the condensing device.

Preferably, a second focusing lens and a third focusing lens are arranged sequentially between the brightness-increasing polarizing plate and the LCD light valve along the light travel direction.

Optionally, the second focusing lens is a positive lens.

Optionally, the third focusing lens is a negative lens.

Preferably, the condensing device adopts a pyramid condenser; a length and a width of an emergent end of the pyramid condenser are larger than a length and a width of a display window of the LCD light valve; or the condensing device adopts a compound parabolic condenser, the compound parabolic condenser is a hollow light guide tube formed by four compound paraboloids; dimensions of opposite compound paraboloids are equal, and lengths of intersection lines of the four compound paraboloids are equal; internal walls of the is compound parabolic condenser are reflective: a light-through hole at an emergent end of the compound parabolic condenser is rectangular; a length and a width of the emergent end are larger than the length and the width of the display window of the LCD light valve; or the condensing device comprises at least one lens for condensing.

Preferably, the lens is a free—from lens.

Optionally, etendue of a light-through hole of an incident end of the pyramid condenser or the compound parabolic condenser is no more than etendue of the LCD light valve under a constraint of the projection lens.

Optionally, when the light passes through the incident and the emergent ends of the pyramid condenser or the compound parabolic condenser, the etendue does not overflow or only slightly overflows.

Optionally, the pyramid condenser is a hollow light guide tube formed by four isosceles trapezoidal planes; dimensions of opposite isosceles trapezoidal planes are equal, and waist lengths of the four isosceles trapezoidal planes are equal; internal walls of the pyramid condenser are reflective.

Preferably, the emergent surface of the transflective plate is attached to the incident end of the condensing device; or the light-transmitting portion and the reflecting portion of the transflective plate are provided on the incident end of the condensing device; or an incident surface of the transflective plate is attached to a substrate of the LED light source.

Preferably, the first focusing lens is a glass lens, a plastic lens, or a Fresnel lens.

Optionally, the first focusing lens is a positive lens.

Optionally, the glass lens and the plastic lens are free-form lenses.

Optionally, an incident surface of the first focusing lens is attached to an emergent end of the condensing device are attached.

Preferably, the polarization modulation plate is a phase plate or a wide-wavelength depolarizer; or the polarization modulation plate is selected from the group consisting of a passive polarizer not changing a polarization state of incident polarized light, a retarder changing the polarization state of incident polarized light, and an active rotator.

Preferably, the retarder is a ¼ wave plate, a ⅛ wave plate, or both.

Preferably, the brightness-increasing polarizing plate is a wire grid polarizer with a brightness-increasing function, or a reflective polarizer with the brightness-increasing function.

Preferably, the brightness-increasing polarizing plate is attached to an emergent surface of the polarization modulation plate.

The present invention also provides a projection method used by an LCD projector optical system, comprising steps of:

separating polarized light by a brightness-increasing polarizing plate after light emitted from an LED light source passes through a light-transmitting portion on a transflective plate, a condensing device, a first focusing lens and a polarization modulation plate in sequence and then reaches the brightness-increasing polarizing plate; transmitting a beam of the polarized light useful for an LCD light valve, and reflecting a beam of the polarized light useless for the LCD light valve, wherein the two beams of the polarized light are linearly polarized light with equal amplitudes and orthogonal vibrations; projecting the beam of the polarized light useful for the LCD light valve by passing through the LCD light valve, a field lens, a reflector and a projection lens in sequence; reflecting the beam of the polarized light useless to the LCD light valve to the light-transmitting portion and a reflecting portion on the transflective plate by passing through the polarization modulation plate, the first focusing lens, and the condensing device; then reflecting the beam of the polarized light useless to the LCD light valve by the LED light source opposite to the reflecting portion and the light-transmitting portion of the transflective plate to pass through the condensing device, the first focusing lens and the polarization modulation plate and reach the brightness-increasing polarizing plate, wherein a polarization plane or polarization of the beam of the polarized light useless to the LCD light valve is changed after passing through the polarization modulation plate twice, in such a manner that the beam of the polarized light useless to the LCD light valve becomes useful to the LCD light valve through the brightness-increasing polarizing plate, thereby completing a polarization conversion process.

Preferably, a second focusing lens and a third focusing lens are arranged sequentially between the brightness-increasing polarizing plate and the LCD light valve along the light travel direction.

Preferably, the LCD projector optical system provides a total projector light utilization efficiency increase $\eta_{inc}$:

$$\eta_{inc} = \Delta\Psi_R + \Delta\Psi_L;$$

wherein:

$$\Delta\Psi_R = 0.5 * \beta * \Omega * T_L * T_P * \left\{ \sum_{n=1}^{\infty} [R_P * (1 - A_S/A_L) * R_M * T_L^2]^n * (1-\beta)^{n-1} \right\};$$

$$\Delta\Psi_L = 0.5 * \beta * \Omega * T_L * T_P * \left[ \sum_{n=1}^{\infty} (R_P * L_R * T_L^2 * A_S/A_L)^n * (1-\beta)^{n-1} \right];$$

wherein: $\Delta\Psi_R$ is a projector light utilization efficiency increase corresponding to the reflecting portion; $\Delta\Psi_L$ is a projector light utilization efficiency increase corresponding to the LED light source: $\beta$ is a modulation efficiency of the polarization modulation plate; $\Omega$ is an energy ratio of light reflected by the brightness-increasing polarizing plate, which passes through the first focusing lens and the condensing device and finally reaches an incident end of the condensing device: $T_L$ is a transmission efficiency of the condensing device and the first focusing lens; $T_P$ and $R_P$ are a transmissivity and a reflectivity of the brightness-increasing polarizing plate; $A_S$ is an area of the light-transmitting portion; $A_L$ is an area of a light-through hole at the incident end of the condensing device: $R_M$ is a surface reflectivity of the reflecting part: and $L_R$ is a reflectivity of the LED light source considering both a light-emitting surface and a substrate.

The beneficial effects of the invention:

1. In the present invention, natural light emitted from the LED light source is polarized by the brightness-increasing polarizing plate to separate the two beams of the polarized light that are useful and useless for the LCD light valve. The polanzation plane or the polanzation of the beam of the polarized light useless to the LCD light valve is changed after passing through the polarization modulation plate twice, in such a manner that the beam of the polarized light useless to the LCD light valve becomes useful to the LCD light valve. In addition, this part of light is reflected by the transflective plate and the LED light source provided at the incident end of the condensing device, so there is no etendue overflow. Therefore, the projector light utilization rate is significantly improved and power consumption is lowered.

2. In the present invention, a solid angle and an area of the light are converted by the first focusing lens, the second focusing lens and the third focusing lens, so that an aperture angle of emergent light of the first focusing lens is much smaller than an aperture angle of incident light incident of the LCD light valve. Therefore, the polarization modulation plate and the brightness-increasing polarizing plate have higher efficiency, and the first focusing lens is more accurate, efficient and easy when condensing the light reflected by the brightness-increasing polarizing plate to the transflective plate. The second focusing lens and the third focusing lens widen the solid angle of the light and narrows an irradiation area, for efficient illumination match of the LCD light valve.

3. In the present invention, the condensing device adopts the pyramid condenser, a compound parabolic condenser, or at least one lens for condensing, which can well match the external dimensions of the light-emitting surface of the LED light source as well as the display window of the LCD light valve, thereby sufficiently improving the utilization rate of LED light source.

BRIEF DESCRIPTION OF THE DRAWINGS

In order to explain embodiments of the present invention or technical solutions in the prior art more clearly, drawings involved in the embodiments or the prior art will be briefly introduced below. Obviously, the drawings in the following description are only some embodiments of the present invention. For those of ordinary skill in the art, without paying any creative work, other drawings may be obtained based on these drawings.

DETAILED DESCRIPTION OF THE PREFERRED EMBODIMENT

To make the technical solutions of the present invention more clearly to those skilled in the art, the present invention will be further illustrated below with reference to the accompanying drawings. The description in this section is only exemplary and explanatory, and should not have any limiting effect on the protection scope of the present invention.

Embodiment 1

Preferring to FIGS. 1-5, the embodiment 1 provides an LCD projector optical system, comprising: an LED light source 1, a transflective plate 2, a condensing device, a first focusing lens 4, a polarization modulation plate 5, a brightness-increasing polarizing plate 6, a second focusing lens 7, a third focusing lens 8, an LCD light valve 9, a field lens 10, a reflector 11, and a projection lens 12, which are all arranged sequentially along a light travel direction.

Figure 1:
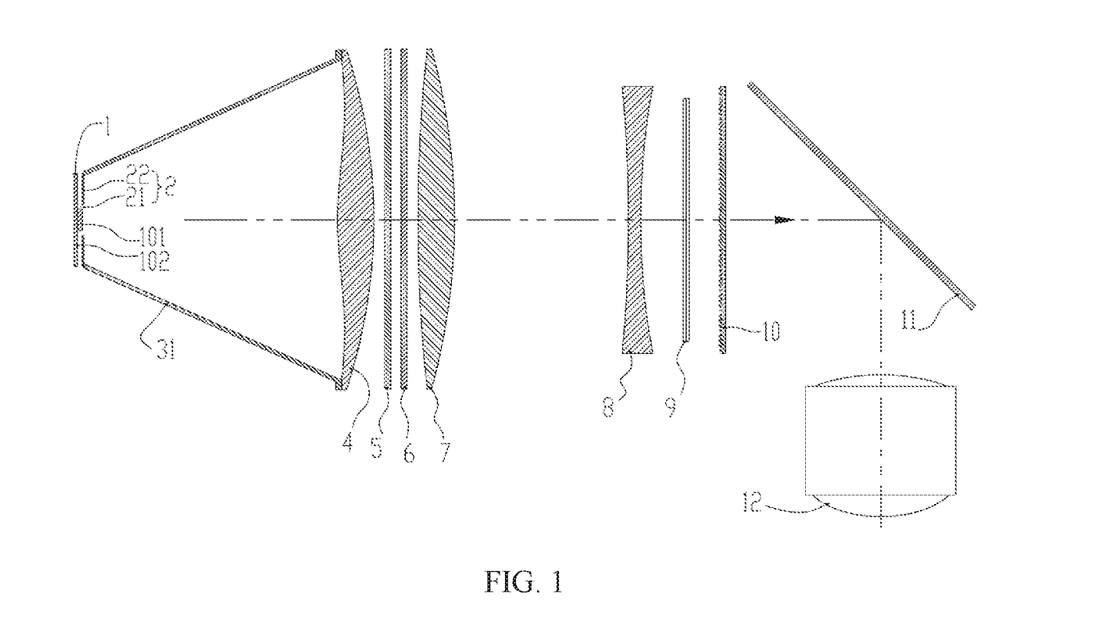
FIG. 1 is a structural view of an embodiment 1 of the present invention.

According to the embodiment 1, the condensing device adopts a pyramid condenser 31; a light-transmitting portion 21 and a reflecting portion 22 of the transflective plate 2 are provided on an incident end of the condensing device. An area of the incident end of the pyramid condenser 31 is equal to etendue corresponding to an external area of the reflecting portion 22, and is no more than etendue of the LCD light valve 9 under a constraint of the projection lens 12. A light-emitting surface 101 of the LED light source 1 is embedded in the light-transmitting portion 21, and a gap between a window of the light-transmitting portion 21 and the light-emitting surface 101 is preferably 0.05-0.12 mm on each side. Preferably, a distance between the light-emitting surface 101 of the LED light source 1 and a reflecting surface of the reflecting portion 22, which is a distance between two planes, is as small as possible.

Window dimensions at an emergent end of the pyramid condenser 31 should be limited by a window length and a window width allowed by a volume of a projector during specific implementation, and are preferably 15-30% larger than a length and a width of a through window of the third focusing lens 8 on each side, to control a volume of a whole machine and to improve collimation of the light passing through the first focusing lens 4 in a forward direction as well as accuracy of the light focused onto a plane of the reflecting portion 22 in a reverse direction.

Etendue at the incident end of the pyramid condenser 31 has no optical meaning unless the light enters through the incident end of the pyramid condenser 31 and exits from the emergent end with no or slight etendue overflow under a designed incident end etendue condition.

A key design element of first focusing lens 4 is that the light separated and reflected by the brightness-increasing polarizing plate 6 can reach as much as possible to the incident end of the pyramid condenser 31, which means only the light reflected reflected back from the LED light source 1 corresponding to the reflecting portion 22 or the light-transmitting portion 21 can be used by the projection lens 12, otherwise it violates basic principles of etendue; wherein the first focusing lens 4 is preferably a glass free-form lens.

At the same time, according to principles of etendue and efficiency requirements, since a designed solid angle of the light emitted by the first focusing lens 4 is much smaller than a solid angle allowed by the LCD light valve 9 while an irradiation area of the light radiated from the emergent surface of the first focusing lens 4 is much larger than a display area of the LCD light valve 9, arrangement of the second focusing lens 7 and the third focusing lens 8 makes the light emitted by the first focusing lens 4 match an aperture angle and an irradiation area of the LCD light valve 9.

The light emitted from the light-emitting surface 101 of the LED light source 1 enters the pyramid condenser 31 through the light-transmitting portion 21. The pyramid condenser 31 can not only condense the light, but also equalize the light and provide virtual image overlapping, so that a spot with a certain uniformity can be obtained at the emergent end. After being refracted by the first focusing lens 4, the light enters the polarization modulation plate 5 and further reaches the incident surface of the brightness-increasing polarizing plate 6.

Figure 5:
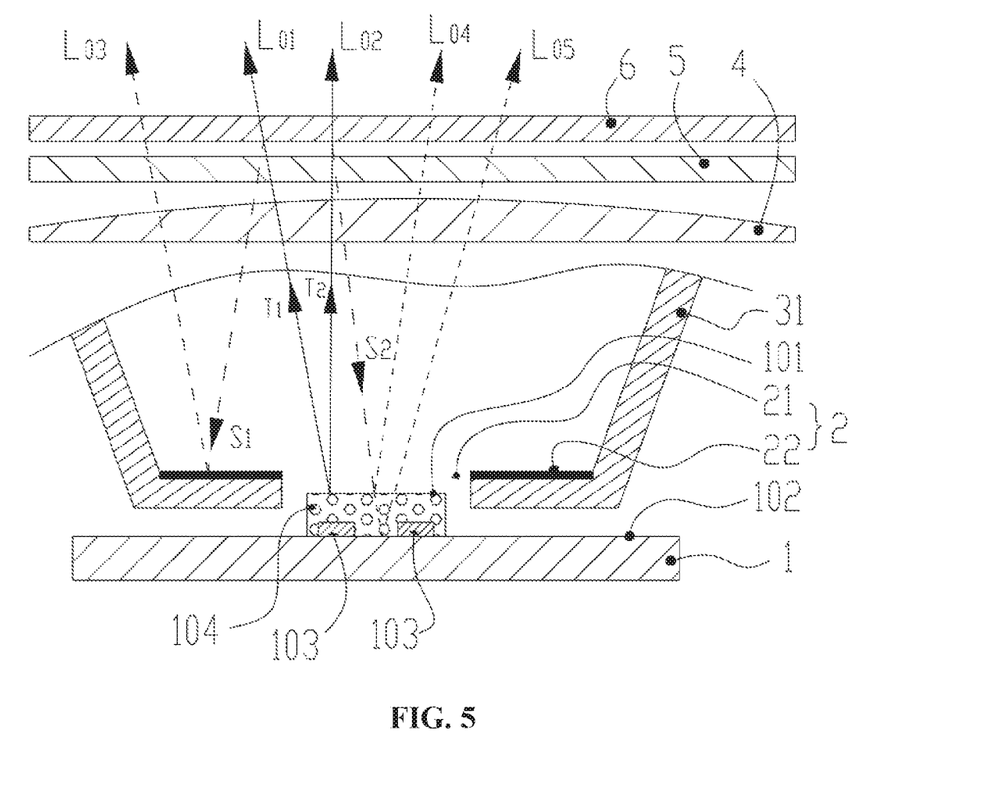
FIG. 5 is a partial enlarged view corresponding to FIG. 1 or FIG. 4.

Referring to FIG. 5, any light $T_1$ emitted from the light-emitting surface 101 of the LED light source 1 is separated by the brightness-increasing polarizing plate 6 into linearly polarized light $L_{01}$ and polarized light $S_1$, wherein $L_{01}$ meets requirements of the LCD light valve 9 and is transmitted; the $S_1$ is reflected by the brightness-increasing polarizing plate 6. The $L_{01}$ and the $S_1$ have equal amplitudes and orthogonal vibrations.

After passing through the polarizing modulation plate 5 and refracted by the first focusing lens 4, the $S_1$ enters the pyramid condenser 31 and reaches the incident end thereof. The $S_1$ irradiates the reflecting portion 22 and is reflected by the reflecting surface of the reflection portion 22 to the brightness-increasing polarizing plate 6. Since the linearly polarized light $S_1$ passes through the polarization modulation plate 5 twice, a polarization plane or polarization is changed and a polarization conversion process is completed, in such a manner that the light S1 that is not useful for the LCD light valve 9 can be transmitted by the brightness-increasing polarizing plate 6 ($L_{03}$). There is no etendue overflow from the beginning to the end ($S_1$ is considered as from the incident end of the pyramid condenser 31, and the etendue of the incident end of the pyramid condenser 31 is ≤the etendue of the LCD light valve 9 under the constraint of the projection lens 12), so $S_1$ can be actually used by the projection lens 12, thereby improving lighting efficiency.

For any light $T_2$ emitted from the light-emitting surface 101 of the LED light source 1, the above process of the light $T_1$, and the $T_2$ is separated by the brightness-increasing polarizing plate 6 into transmitted $L_{02}$ and reflected $S_2$. The linearly polarized light S2 passes through the light-transmitting portion 21 to reach the LED light source 1, and is partially reflected by the light-emitting surface 101 and a substrate 102 of the LED light source 1, which then reaches the brightness-increasing polarizing plate 6 again and is emitted ($L_{04}$, $L_{05}$). A part of the light S2 not reflected by the light-emitting surface 101 and the substrate 102 of the LED light source 1 is blocked by a group of LED chips 103, phosphor, and silica gel 104, thus being absorbed and converted into Joule heat.

According to the embodiment 1, an LCD projector optical system provides a total projector light utilization rate increase $\eta_{inc}$, which is calculated as:

$$\eta_{inc} = \Delta\Psi_R + \Delta\Psi_L;$$

wherein:

$$\Delta\Psi_R = 0.5 * \beta * \Omega * T_L * T_P * \left\{ \sum_{n=1}^{\infty} [R_P * (1 - A_S/A_L) * R_M * T_L^2]^n * (1-\beta)^{n-1} \right\};$$

$$\Delta\Psi_L = 0.5 * \beta * \Omega * T_L * T_P * \left[ \sum_{n=1}^{\infty} (R_P * L_R * T_L^2 * A_S/A_L)^n * (1-\beta)^{n-1} \right];$$

wherein:

$\Delta\Psi_R$ is a projector light utilization efficiency increase corresponding to the reflecting portion 22;

$\Delta\Psi_L$ is a projector light utilization efficiency increase corresponding to the LED light source 1, which is also a projector light utilization efficiency increase corresponding to the light-transmitting portion 21;

$\beta$ is a modulation efficiency of the polarization modulation plate 5, which is expressed as a percentage of energy:

$\Omega$ is an energy ratio of light reflected by the brightness-increasing polarizing plate 6, which passes through the first focusing lens 4 and the condensing device and finally reaches an incident end of the condensing device: in theoretical derivation, losses such as scattering and absorption can be ignored; it can be considered as a proportion of the light reflected by the brightness-increasing polarizing plate 6 after minus the light with the etendue overflow, which is essentially a control level of the etendue overflow of the first focusing lens 4 and the condensing device:

$T_L$ is a transmission efficiency of the condensing device and the first focusing lens 4, which is an energy ratio of the emergent surface of the first focusing lens 4 and the incident end of the pyramid condenser 31;

$T_P$ and $R_P$ are a transmissivity and a reflectivity of the brightness-increasing polarizing plate 6;

$A_S$ is an area of the light-transmitting portion 21; $A_L$ is an area of a light-through hole at the incident end of the pyramid condenser 31:

$R_M$ is a surface reflectivity of the reflecting part 22; and $L_R$ is a reflectivity of the LED light source 1 considering both a light-emitting surface 101 and a substrate 102.

According to the embodiment 1, the projector optical system can increase the light utilization efficiency by more than double to significantly improve the projector light utilization rate, output the same brightness, and save more than double the power consumption.

Embodiment 2

Figure 2:
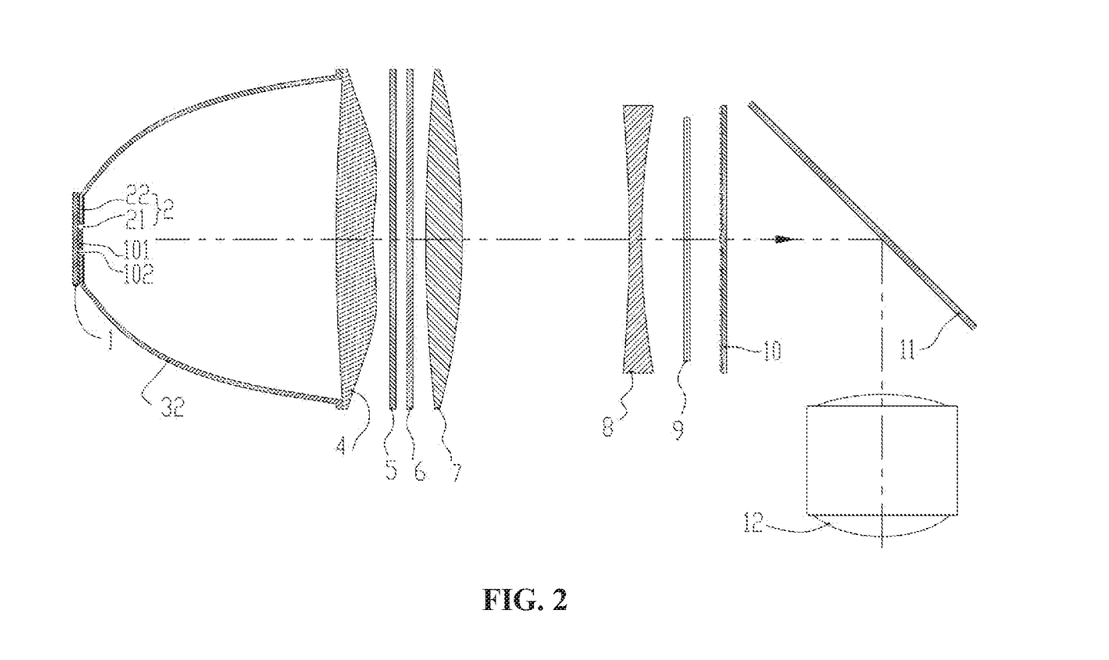
FIG. 2 is a structural view of an embodiment 2 of the present invention.

Referring to FIGS. 2 and 5, different from the embodiment 1, in the embodiment 2, the condensing device adopts a compound parabolic condenser 32; a light-transmitting portion 21 and a reflecting portion 22 of the transflective plate 2 are provided on an incident end of the condensing device. Etendue corresponding to an area of the incident end of the compound parabolic condenser 32 is no more than etendue of the LCD light valve 9 under a constraint of the projection lens 12. A light-emitting surface 101 of the LED light source 1 is embedded in the light-transmitting portion 21, and a gap between a window of the light-transmitting portion 21 and the light-emitting surface 101 is preferably 0.05-0.12 mm on each side. Preferably, a distance between the light-emitting surface 101 of the LED light source 1 and a reflecting surface of the reflecting portion 22, which is a distance between two planes, is as small as possible.

Specific condensing principle of the compound parabolic condenser 32 is different from that of the pyramid condenser 31, and requirements for the first focusing lens 4 are also different. Remaining principles and calculation formulas are the same as those in the embodiment 1.

When designing the compound parabolic condenser 32, it needs to be designed in combination with the first focusing lens 4 in order to obtain better optical efficiency and smaller volume.

Because of limitation due to optical characteristics of the compound parabolic condenser 32, that is, at a certain length, the incident end of the compound parabolic condenser 32 greatly limits a collection solid angle range of the LED light source 1, and does not greatly help light equalizing, a size of the LCD light valve 9 according to the embodiment 2 are relatively small (such as 3.5 inches or less), which has a relatively high system efficiency. In addition, the smaller the size of the LCD light valve 9 is, the more suitable it is to use such reflective parabolic reflector condenser.

Embodiment 3

Figure 3:
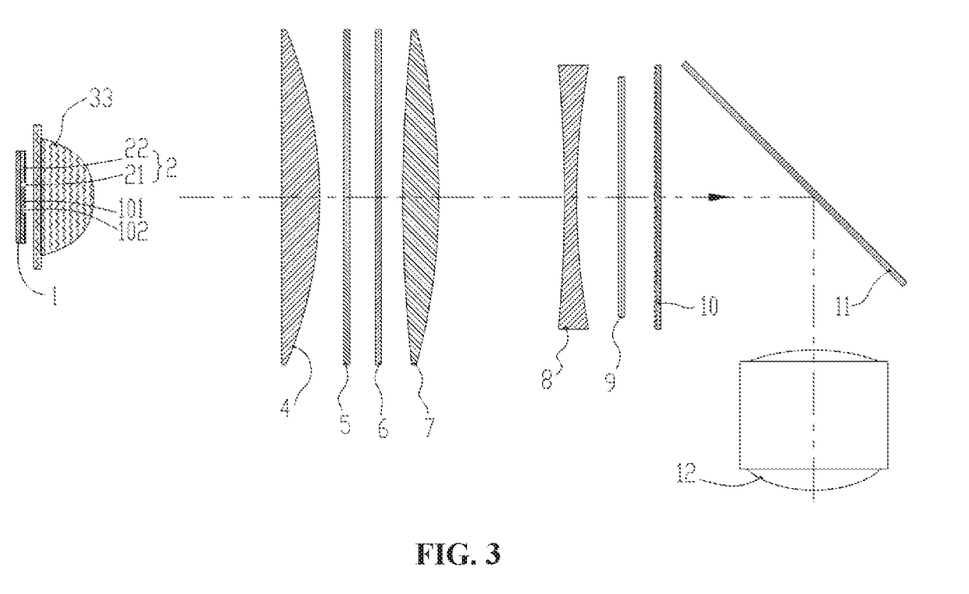
FIG. 3 is a structural view of an embodiment 3 of the present invention.

Referring to FIGS. 3 and 5, different from the embodiment 1, in the embodiment 3, the condensing device comprises at least one lens 33 for condensing, and the lens 33 is preferably a plano-convex free-form lens.

Taking one lens 33 as an example, the incident surface of the transflective plate 2 is attached to the substrate 102 of the LED light source 1; a thickness of the transflective plate is equal to a height of the light emitting surface 101 of the LED light source 1 on the substrate 102. An area of the reflecting portion 22 of the transflective plate 2 is at least no less than an area corresponding to allowable etendue on the optical system where the reflecting surface is located; the light-emitting surface 101 of the LED light source 1 is embedded in the light-transmitting portion 21, and a gap between a window of the light-transmitting portion 21 and the light-emitting surface 101 is preferably 0.05-0.12 mm.

Deflection efficiency of the embodiment 3 can be calculated with reference to the embodiment 1. In the embodiment 3, design and manufacture of the first focusing lens 4 are relatively simple. In addition, when a $A_S/A_L$ value is 55%-65%, efficiency can be increased to a certain extend by taking advantage of conventional technologies of the LED light source 1, while the light with etendue overflow will not adversely affect the LCD light valve 9, which is one of the unique and particularly important advantages of the embodiment 3.

Embodiment 4

Figure 4:
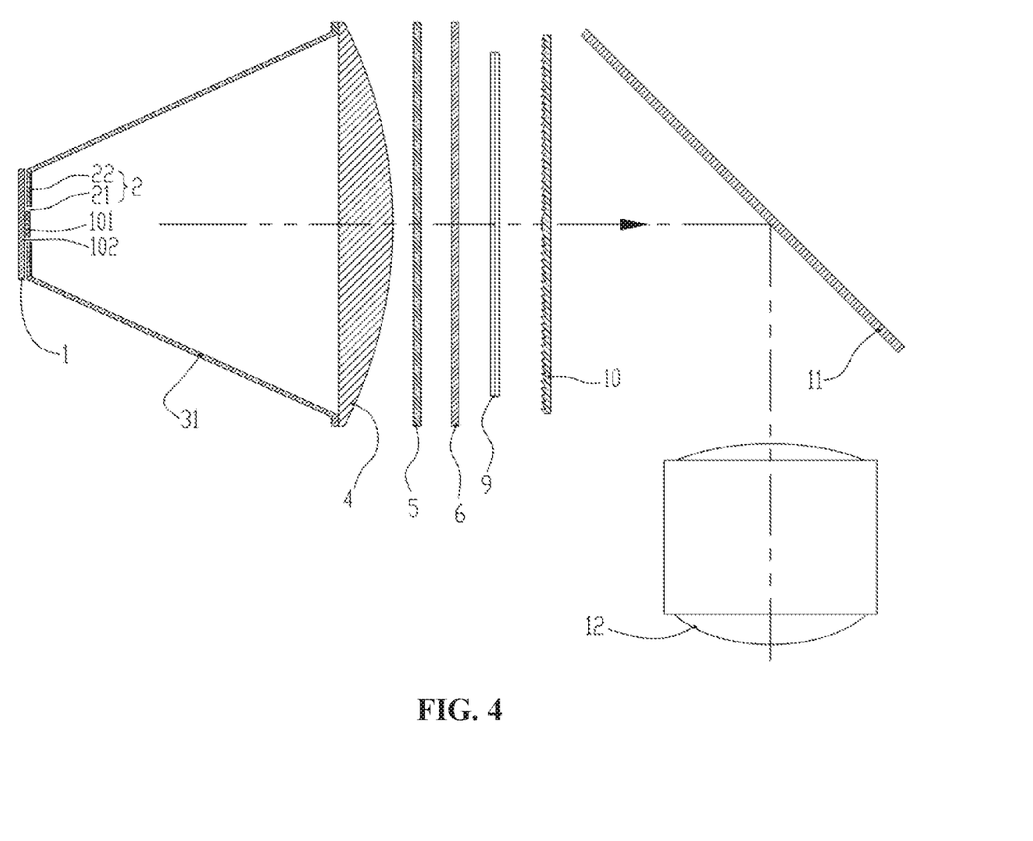
FIG. 4 is a structural view of an embodiment 4 of the present invention.

Referring to FIGS. 4 and 5, the embodiment 4 provides an LCD projector optical system, comprising: an LED light source 1, a condensing device, a first focusing lens 4, a polarization modulation plate 5, a brightness-increasing polarizing plate 6, an LCD light valve 9, a field lens 10, a reflector 11, and a projection lens 12, which are all arranged sequentially along a light travel direction. Different from the embedment 1, the second focusing lens 7 and the third focusing lens 8 between the brightness-increasing polarizing plate 6 and LCD light valve 9 are removed in the embodiment 4. Although the embodiment 4 sacrifices some deflection efficiency compared to the previous three embodiments, the projector optical system is small in size, low in cost, and simple in structure. Although performance is decreased, price-performance ratio is maintained since cost is also lowered.

Specific embodiments are used to explain the principles and implementations of the present invention. The above embodiments are only used to help understand the method of the present invention and its core ideas. The above are only preferred embodiments of the present invention. It should be pointed out that character expression is limited, but there are objectively unlimited specific structures. For those of ordinary skill in the art, without departing from the principles of the present invention, several improvements, modifications or changes can be made, or the above technical features can also be combined in an appropriate manner. These improvements, modifications, changes or combinations, or directly apply the inventive concepts and technical solutions to other occasions without improvement, should fall into the protection scope of the present invention.

What is claimed is:

1. An LCD (liquid-crystal display) projector optical system, comprising: an LED (light-emitting diode) light source (1), a transflective plate (2), a condensing device, a first focusing lens (4), a polarization modulation plate (5), a brightness-increasing polarizing plate (6), an LCD light valve (9), a field lens (10), a reflector (11), and a projection lens (12), which are all arranged sequentially along a light travel direction; wherein the transflective plate (2) has a light-transmitting portion (21) which allows light to pass through; a size and an area of the light-transmitting portion (21) are no less than a size and an area of a light-emitting surface (101) of the LED light source (1); an emergent surface of the transflective plate (2) has a reflecting portion (22) for reflecting light;

the light-emitting surface (101) of the LED light source (1) is opposite to the light-transmitting portion (21);

external dimensions of the reflecting portion (22) are no less than dimensions of a light-through hole at an incident end of the condensing device.

2. The LCD projector optical system, as recited in claim 1, wherein a second focusing lens (7) and a third focusing lens (8) are arranged sequentially between the brightness-increasing polarizing plate (6) and the LCD light valve (9) along the light travel direction.

3. The LCD projector optical system, as recited in claim 1, wherein the condensing device adopts a pyramid condenser (31); a length and a width of an emergent end of the pyramid condenser (31) are larger than a length and a width of a display window of the LCD light valve (9); or the condensing device adopts a compound parabolic condenser (32); the compound parabolic condenser (32) is a hollow light guide tube formed by four compound paraboloids; dimensions of opposite compound paraboloids are equal, and lengths of intersection lines of the four compound paraboloids are equal; internal walls of the compound parabolic condenser (32) are reflective; a light-through hole at an emergent end of the compound parabolic condenser (32) is rectangular; a length and a width of the emergent end are larger than the length and the width of the display window of the LCD light valve (9); or the condensing device comprises at least one lens (33) for condensing.

4. The LCD projector optical system, as recited in claim 2, wherein the condensing device adopts a pyramid condenser (31); a length and a width of an emergent end of the pyramid condenser (31) are larger than a length and a width of a display window of the LCD light valve (9); or the condensing device adopts a compound parabolic condenser (32); the compound parabolic condenser (32) is a hollow light guide tube formed by four compound paraboloids; dimensions of opposite compound paraboloids are equal, and lengths of intersection lines of the four compound paraboloids are equal; internal walls of the compound parabolic condenser (32) are reflective; a light-through hole at an emergent end of the compound parabolic condenser (32) is rectangular; a length and a width of the emergent end are larger than the length and the width of the display window of the LCD light valve (9); or the condensing device comprises at least one lens (33) for condensing.

5. The LCD projector optical system, as recited in claim 1, wherein the emergent surface of the transflective plate (2) is attached to the incident end of the condensing device; or the light-transmitting portion (21) and the reflecting portion (22) of the transflective plate (2) are provided on the incident end of the condensing device; or an incident surface of the transflective plate (2) is attached to a substrate (102) of the LED light source (1).

6. The LCD projector optical system, as recited in claim 2, wherein the emergent surface of the transflective plate (2) is attached to the incident end of the condensing device; or the light-transmitting portion (21) and the reflecting portion (22) of the transflective plate (2) are provided on the incident end of the condensing device; or
an incident surface of the transflective plate (2) is attached to a substrate (102) of the LED light source (1).

7. The LCD projector optical system, as recited in claim 1, wherein the first focusing lens (4) is a glass lens, a plastic lens, or a Fresnel lens.

8. The LCD projector optical system, as recited in claim 2, wherein the first focusing lens (4) is a glass lens, a plastic lens, or a Fresnel lens.

9. The LCD projector optical system, as recited in claim 1, wherein the polarization modulation plate (5) is a phase plate or a wide-wavelength depolarizer; or
the polarization modulation plate (5) is selected from the group consisting of a passive polarizer not changing a polarization state of incident polarized light, a retarder changing the polarization state of incident polarized light, and an active rotator.

10. The LCD projector optical system, as recited in claim 2, wherein the polarization modulation plate (5) is a phase plate or a wide-wavelength depolarizer; or
the polarization modulation plate (5) is selected from the group consisting of a passive polarizer not changing a polarization state of incident polarized light, a retarder changing the polarization state of incident polarized light, and an active rotator.

11. The LCD projector optical system, as recited in claim 9, wherein the retarder is a ¼ wave plate, a ⅛ wave plate, or both.

12. The LCD projector optical system, as recited in claim 10, wherein the retarder is a ¼ wave plate, a ⅛ wave plate, or both.

13. The LCD projector optical system, as recited in claim 1, wherein the brightness-increasing polarizing plate (6) is a wire grid polarizer with a brightness-increasing function, or a reflective polarizer with the brightness-increasing function.

14. The LCD projector optical system, as recited in claim 2, wherein the brightness-increasing polarizing plate (6) is a wire grid polarizer with a brightness-increasing function, or a reflective polarizer with the brightness-increasing function.

15. The LCD projector optical system, as recited in claim 1, wherein the brightness-increasing polarizing plate (6) is attached to an emergent surface of the polarization modulation plate (5).

16. The LCD projector optical system, as recited in claim 2, wherein the brightness-increasing polarizing plate (6) is attached to an emergent surface of the polarization modulation plate (5).

17. A projection method used by an LCD projector optical system, comprising steps of:
separating polarized light by a brightness-increasing polarizing plate (6) after light emitted from an LED light source (1) passes through a light-transmitting portion (21) on a transflective plate (2), a condensing device, a first focusing lens (4) and a polarization modulation plate (5) in sequence and then reaches the brightness-increasing polarizing plate (6); transmitting a beam of the polarized light useful for an LCD light valve (9), and reflecting a beam of the polarized light useless for the LCD light valve (9), wherein the two beams of the polarized light are linearly polarized light with equal amplitudes and orthogonal vibrations; projecting the beam of the polarized light useful for the LCD light valve (9) by passing through the LCD light valve (9), a field lens (10), a reflector (11) and a projection lens (12) in sequence; reflecting the beam of the polarized light useless to the LCD light valve (9) to the light-transmitting portion (21) and a reflecting portion (22) on the transflective plate (2) by passing through the polarization modulation plate (5), the first focusing lens (4), and the condensing device; then reflecting the beam of the polarized light useless to the LCD light valve (9) by the LED light source (1) opposite to the reflecting portion (22) and the light-transmitting portion (21) of the transflective plate (2) to pass through the condensing device, the first focusing lens (4) and the polarization modulation plate (5) and reach the brightness-increasing polarizing plate (6), wherein a polarization plane or polarization of the beam of the polarized light useless to the LCD light valve (9) is changed after passing through the polarization modulation plate (5) twice, in such a manner that the beam of the polarized light useless to the LCD light valve (9) becomes useful to the LCD light valve (9) through the brightness-increasing polarizing plate (6), thereby completing a polarization conversion process;
wherein the LCD projector optical system provides a total projector light utilization efficiency increase $\eta_{inc}$:

$$\eta_{inc} = \Delta\Psi_R + \Delta\Psi_L;$$

wherein:

$$\Delta\Psi_R = 0.5 * \beta * \Omega * T_L * T_P * \left\{\sum_{n=1}^{\infty} [R_P * (1 - A_S/A_L) * R_M * T_L^2]^n * (1-\beta)^{n-1}\right\};$$

$$\Delta\Psi_L = 0.5 * \beta * \Omega * T_L * T_P * \left[\sum_{n=1}^{\infty} (R_P * L_R * T_L^2 * A_S/A_L)^n * (1-\beta)^{n-1}\right];$$

wherein: $\Delta\Psi_R$ is a projector light utilization efficiency increase corresponding to the reflecting portion (22); $\Delta\Psi_L$ is a projector light utilization efficiency increase corresponding to the LED light source (1); $\beta$ is a modulation efficiency of the polarization modulation plate (5); $\Omega$ is an energy ratio of light reflected by the brightness-increasing polarizing plate (6), which passes through the first focusing lens (4) and the condensing device and finally reaches an incident end of the condensing device; $T_L$ is a transmission efficiency of the condensing device and the first focusing lens (4); $T_P$ and $R_P$ are a transmissivity and a reflectivity of the brightness-increasing polarizing plate (6); $A_S$ is an area of the light-transmitting portion (21); $A_L$ is an area of a light-through hole at the incident end of the condensing device; $R_M$ is a surface reflectivity of the reflecting part (22); and $L_R$ is a reflectivity of the LED light source (1) considering both a light-emitting surface (101) and a substrate (102).

18. A projection method used by an LCD projector optical system, comprising steps of:
separating polarized light by a brightness-increasing polarizing plate (6) after light emitted from an LED light source (1) passes through a light-transmitting portion (21) on a transflective plate (2), a condensing device, a first focusing lens (4) and a polarization modulation plate (5) in sequence and then reaches the brightness-increasing polarizing plate (6); transmitting a beam of the polarized light useful for an LCD light valve (9), and reflecting a beam of the polarized light useless for the LCD light valve (9), wherein the two beams of the polarized light are linearly polarized light with equal amplitudes and orthogonal vibrations; projecting the beam of the polarized light useful for the LCD light valve (9) by passing through the LCD light valve (9), a field lens (10), a reflector (11) and a projection lens (12) in sequence; reflecting the beam of the polarized light useless to the LCD light valve (9) to the light-transmitting portion (21) and a reflecting portion (22) on the transflective plate (2) by passing through the polarization modulation plate (5), the first focusing lens (4), and the condensing device; then reflecting the beam of the polarized light useless to the LCD light valve (9) by the LED light source (1) opposite to the reflecting portion (22) and the light-transmitting portion (21) of the transflective plate (2) to pass through the condensing device, the first focusing lens (4) and the polarization modulation plate (5) and reach the brightness-increasing polarizing plate (6), wherein a polarization plane or polarization of the beam of the polarized light useless to the LCD light valve (9) is changed after passing through the polarization modulation plate (5) twice, in such a manner that the beam of the polarized light useless to the LCD light valve (9) becomes useful to the LCD light valve (9) through the brightness-increasing polarizing plate (6), thereby completing a polarization conversion process;

wherein a second focusing lens (7) and a third focusing lens (8) are arranged sequentially between the brightness-increasing polarizing plate (6) and the LCD light valve (9) along the light travel direction;

wherein the LCD projector optical system provides a total projector light utilization efficiency increase $\eta_{inc}$:

$$\eta_{inc} = \Delta\Psi_R + \Delta\Psi_L;$$

wherein:

$$\Delta\Psi_R = 0.5 * \beta * \Omega * T_L * T_P * \left\{\sum_{n=1}^{\infty} [R_P * (1 - A_S/A_L) * R_M * T_L^2]^n * (1-\beta)^{n-1}\right\};$$

$$\Delta\Psi_L = 0.5 * \beta * \Omega * T_L * T_P * \left[\sum_{n=1}^{\infty} (R_P * L_R * T_L^2 * A_S/A_L)^n * (1-\beta)^{n-1}\right];$$

wherein: $\Delta\Psi R$ is a projector light utilization efficiency increase corresponding to the reflecting portion (22); $\Delta\Psi_L$ is a projector light utilization efficiency increase corresponding to the LED light source (1); β is a modulation efficiency of the polarization modulation plate (5); Ω is an energy ratio of light reflected by the brightness-increasing polarizing plate (6), which passes through the first focusing lens (4) and the condensing device and finally reaches an incident end of the condensing device; $T_L$ is a transmission efficiency of the condensing device and the first focusing lens (4); $T_P$ and $R_P$ are a transmissivity and a reflectivity of the brightness-increasing polarizing plate (6); $A_S$ is an area of the light-transmitting portion (21); $A_L$ is an area of a light-through hole at the incident end of the condensing device; $R_M$ is a surface reflectivity of the reflecting part (22); and $L_R$ is a reflectivity of the LED light source (1) considering both a light-emitting surface (101) and a substrate (102).

\* \* \* \* \*